(No Model.) 6 Sheets—Sheet 1.
J. H. TSCHOPP.
SHEDDING MECHANISM FOR LOOMS.

No. 510,657. Patented Dec. 12, 1893.

Witnesses:
Inventor:
Johann Heinrich Tschopp
By Richard & G.
his Attorneys.

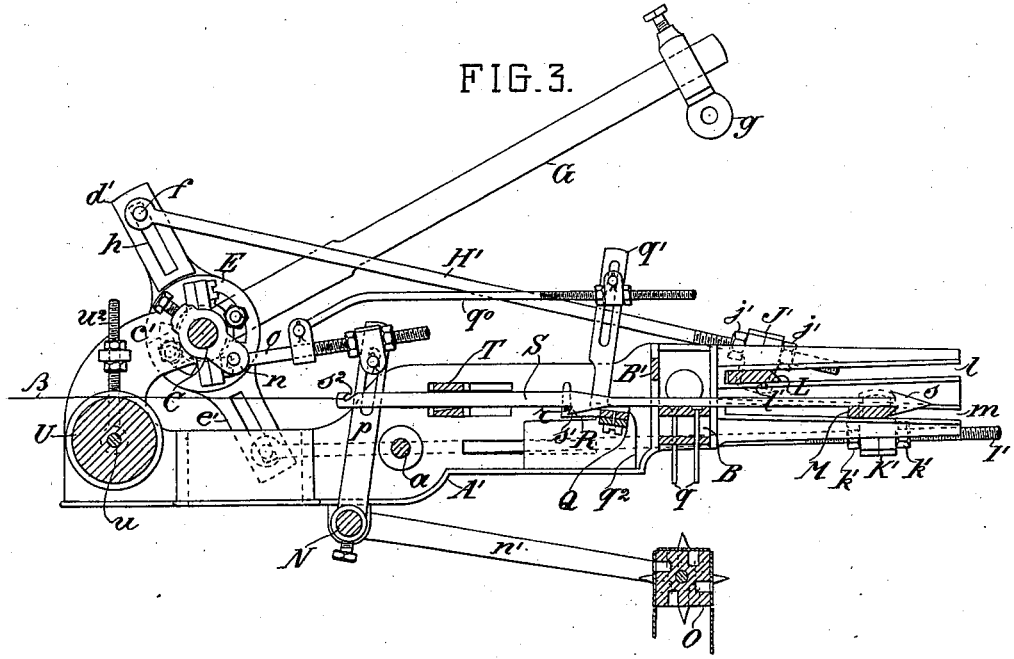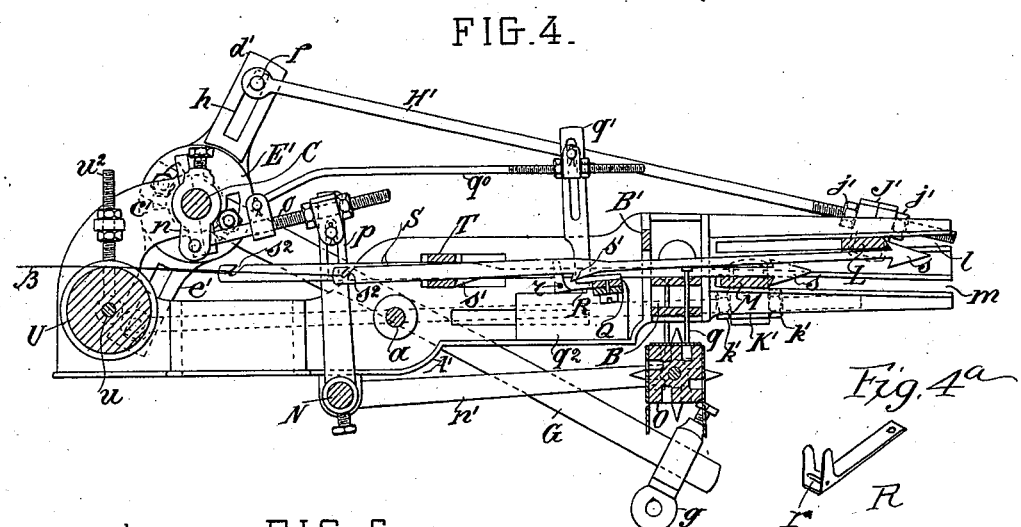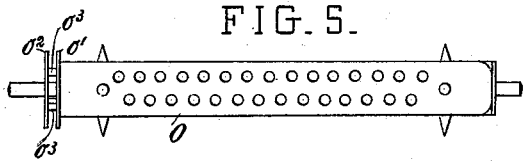

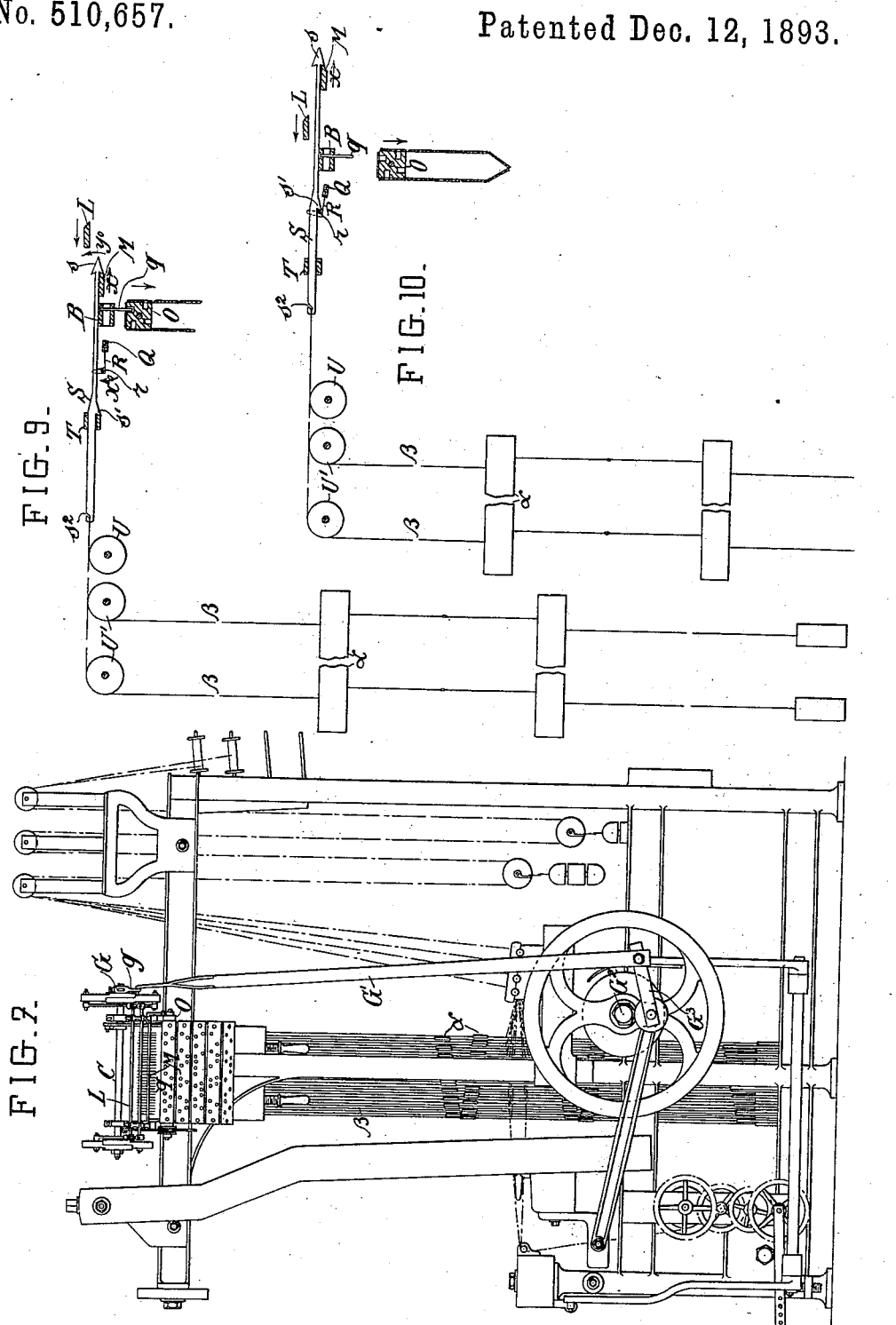

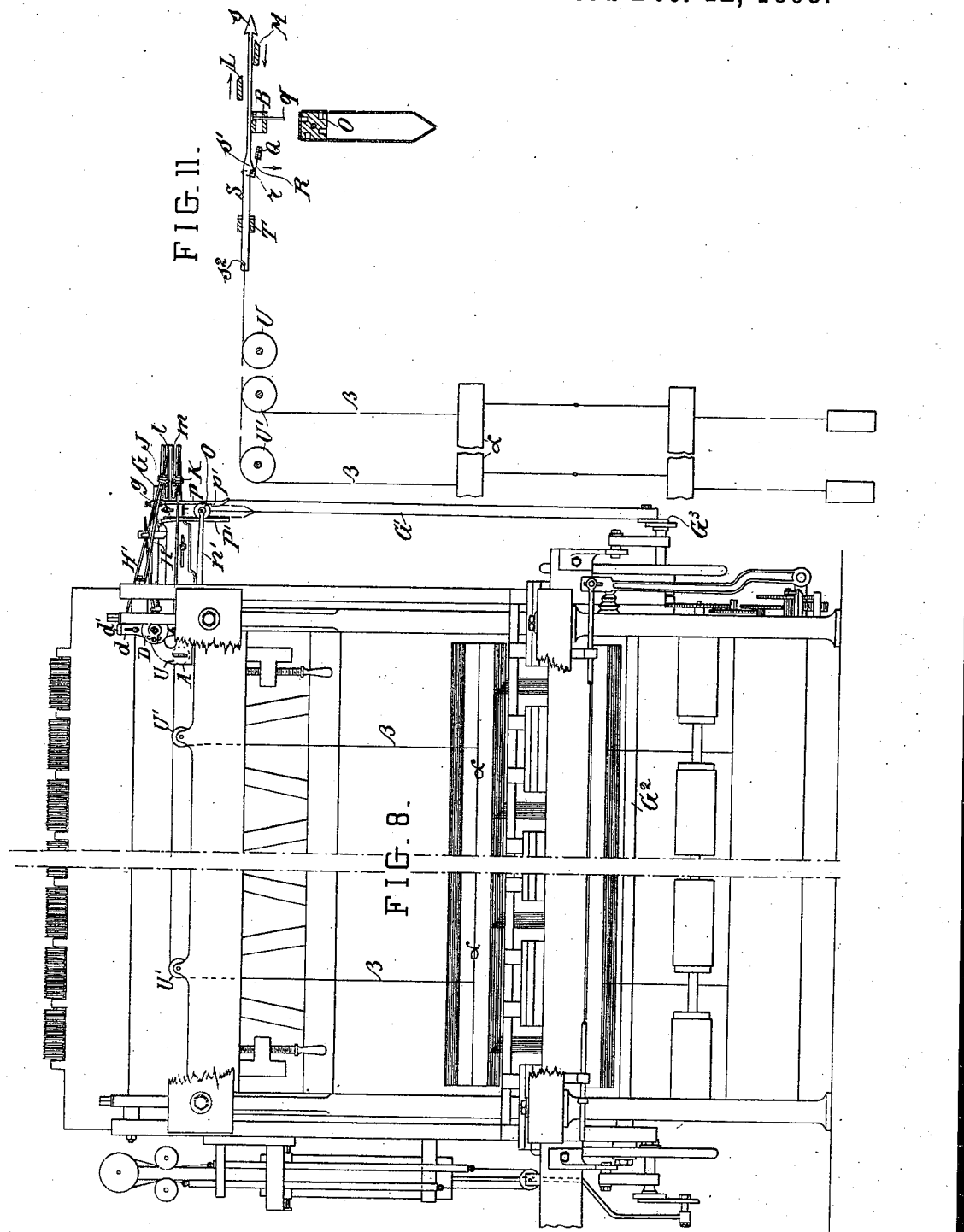

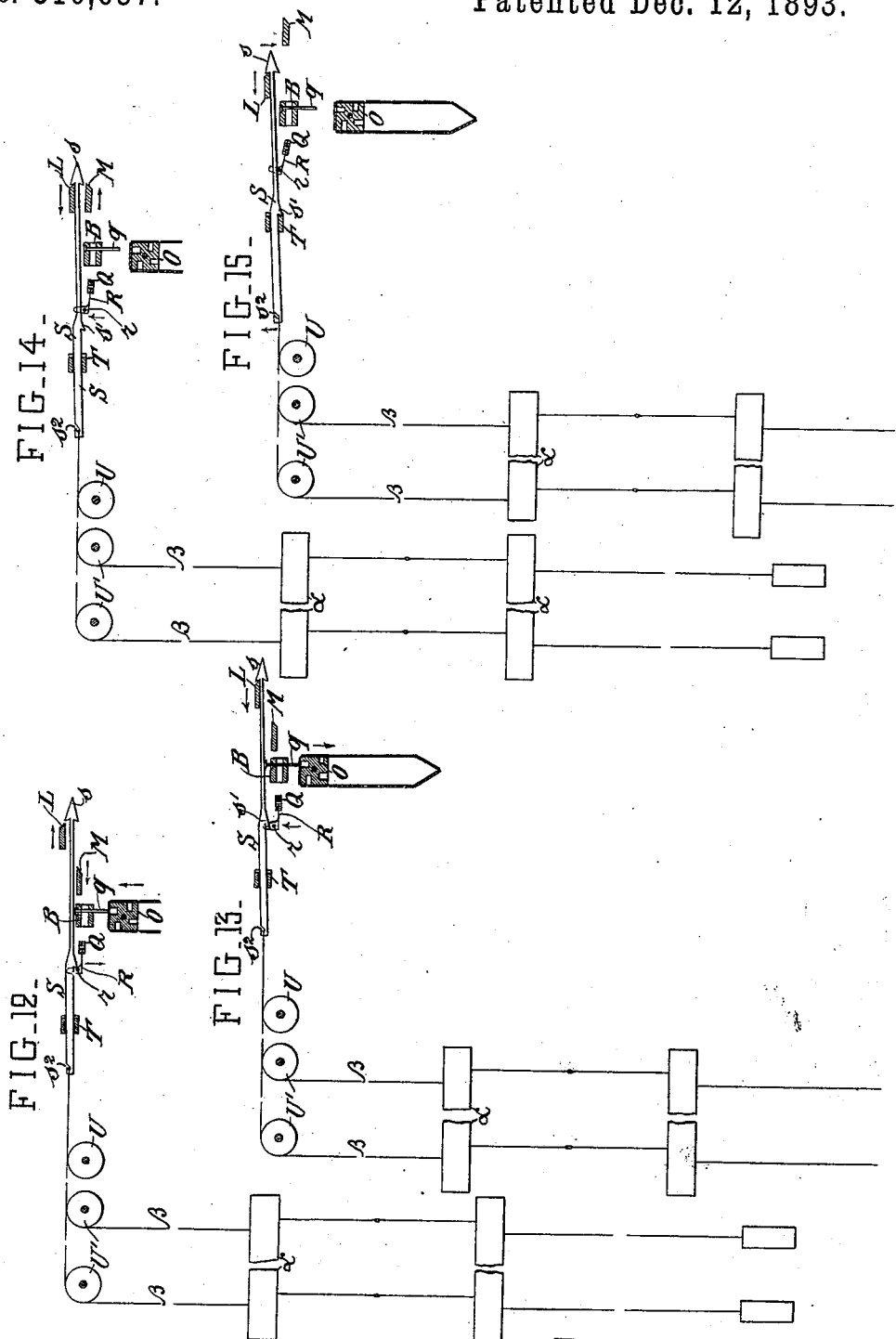

(No Model.)
6 Sheets—Sheet 6.

J. H. TSCHOPP.
SHEDDING MECHANISM FOR LOOMS.

No. 510,657.
Patented Dec. 12, 1893.

Witnesses.
E. R. Bolton
E. K. Sturtevant

Inventor:
Johann Heinrich Tschopp
By Richards
his Attorneys.

UNITED STATES PATENT OFFICE.

JOHANN HEINRICH TSCHOPP, OF ZIEFEN, SWITZERLAND.

SHEDDING MECHANISM FOR LOOMS.

SPECIFICATION forming part of Letters Patent No. 510,657, dated December 12, 1893.

Application filed January 23, 1893. Serial No. 459,352. (No model.) Patented in Switzerland January 10, 1891, No. 2,845, and in Germany January 27, 1891, No. 62,395.

*To all whom it may concern:*

Be it known that I, JOHANN HEINRICH TSCHOPP, a citizen of the Swiss Republic, residing in Ziefen, canton of Basle, Switzerland, have invented certain new and useful Improvements in Shedding Mechanism for Looms, of which the following is a specification.

The invention has been patented in Switzerland, No. 2,845, dated January 10, 1891, and in Germany, No. 62,395, dated January 27, 1891.

In the annexed drawings, Figures 1 and 2, represent a side and plan view of the mechanism embodying my invention. Fig. 3, is a longitudinal section following the line X X of Fig. 2. Fig. 4, shows a longitudinal view of the mechanism in reversed position. Fig. 4$^a$ is a detail view of one of the spring catches for holding the lifting wires. Fig. 5, represents a front view of the card cylinder, and Fig. 6 shows a lifting wire in profile. Figs. 7 and 8 show a side view and a front view of a ribbon loom provided with the invention. Figs. 9, 10, 11, 12, 13, 14, 15, 16 and 17 are diagrams which serve for the illustration of the way the machine works.

The two side pieces A, A' of the frame (Figs. 1—4) are fixed together by the pin $a$, and by the needle board B. The frame is fastened horizontally to either of the head extremities of the ribbon loom by the two slits $a'$ $a^2$ as shown in Figs. 7 and 8.

Near the rear end of the machine which is turned toward the loom the shaft C, is journaled in the two brasses $c$, $c'$. Two sheaves D, E and D', E' are fixed on the ends of the shaft C, and each of these sheaves carries one of the arms $d$, $e$, and $d'$, $e'$. The two sheaves are held together by two pins which are fixed to a piece F or F' and the whole is fixed to the shaft C by the screw nuts $c^2$, $c^3$. The arc shaped slots of the sheaves through which the pins pass allow the revolving of the same upon the shaft C and also that of their arms $d$, $e$, and $d'$, and $e$ for adjustment. The piece F' carries a lever arm G, upon which a movable ring $g$ is fixed by which the lever G is connected with the connecting rod G' Figs. 7 and 8, which as usual is actuated by the crank G$^3$ on the main shaft G$^2$ of the ribbon loom. The pins $f$, fix the rods H, H' to the arms $d$, $d'$ and the rods I, I', to the arms $e$, $e'$. The pins $f$, can move in the radial slots $h$, of the arms. The arms $d'$, $e'$, of the sheaves D', E' are a little longer than the arms $d$, $e$, of the sheaves D, E. The two part bearings J, J' and K, K' are pushed over the rods H, H' and I, I', at their other extremities. They are fastened upon said rods H, H' and I, I' by the screw nuts $j, j$, and $j', j'$, $k, k$, and $k'$, $k'$. The terminal plugs of the upper lifting blade L, rest in the bearings J, J' on the rods H, H', while the lower lifting blade M is supported in the bearings K, K' of the rods I, I'. These lifting blades are guided by the horizontal slits $l$, $m$, of the frame. The lifting blades are moved forward and backward in the slits $l$ by the oscillations of the shaft C and they move in opposite directions. The pins $l'$, $m'$ prevent deviation of the lifting blades. The movement of the shaft C by means of the crank $n$, is further transmitted to the shaft N, by the articulated rod $o$, and the lever $p$. At the two ends of said shaft are fixed the levers $n'$ which carry the square card prism O. The double needle board B, is adapted to the frame over that cylinder and the needle pins $q$, are located symmetrically in the needle board. Each needle has a head which fits in a corresponding opening in the needle board in order to prevent their falling out. The card prism O is, as usual, provided with holes corresponding to the needles. At the head end of the card cylinder O, are fixed the two metallic sheaves $o'$, $o^2$, between which are disposed four pins $o^3$ corresponding to the four sides of the card prism; the levers P and P' fastened to the wall A, of the frame catch between the sheaves $o$ and $o'$, and the lever P. is provided with a hook $p'$. A spring $p^2$ attached to the two levers, presses the same continually against the pins $o^3$. During the downward motion of the cylinder O, each of the pins $o^3$ touches at its time the hook $p'$ of the lever P and as a consequence said cylinder makes each time one quarter of a rotation. The rod $o$, is moreover connected with a lever $q'$ by a second rod $q^0$; said lever $q'$ is fixed to a cross bar Q the axle ends of which rest and can revolve in brasses $q^2$ which are movable in a horizontal direction and are attached to the frame. These brasses are adjusted in slots in the side frames by loosening the nuts $q^x$ Figs. 1 and 2, sliding the brasses forward or backward and fixing them in their adjusted positions by tightening the said nuts. The bar Q consists of two parts screwed together between which a number of spring catches R corresponding to that of the harness frames of the loom are located. The free extremity of each of those spring catches R carries vertically bent side pallets as in Fig. 4$^a$ so that at that extremity the spring catches have a U shaped cross section. The pallets carry a pin $r$. As a consequence of this arrangement the swinging of the lever G is also transmitted to the bar Q and to the spring R which has for its object to facilitate the engagement and disengagement of the lifting wires with the holding pins thereof. An indent $s^2$ at the rear part of each of the lifting wires allows the attachment of the harness cords. These lifting wires S rest with their lower surfaces or sides upon the needle board B and upon a forward and backward adjustable cross bar T supported in the frame. This bar has slots or openings through which the wires pass. The bar is adjustable in slots in the side frames by the screw rods $T^x$ and nuts shown in Figs. 1 and 2. A cross bar B', provided with notches through which the lifting wires pass, is also disposed behind the needle board B; so deviation of the lifting wires is made impossible. During the normal position of the lifting wires S the spurs $s'$ rest against the bar T so that the latter limit the return motion of the lifting wires and consequently the downward motion of the harness frames. The harness cords pass over grooved rollers U, located at the rear end of the dobby machine. These rollers revolve upon a common shaft $u$, the ends of which fit into slits $u'$ of the frame and which rest in two bearings which can be regulated by screw nuts.

The new dobby works as follows: The rotation of the main shaft G$^2$ of the ribbon loom is, as usual changed into a swinging motion by the means of a crank and of a connecting rod, and it is transmitted to the lever G and the shaft C. By the upward motion of the lever G the lower lifting blade M is pushed forward in the direction of the arrow, Figs. 1 and 9, by the rods I and I', while the upper lifting blades L are drawn back in the opposite direction by the rods H and H', the lifting wires of which are not lifted by the pins $q$, and the harness frames connected therewith are carried along by the blade M, in its motion by means of the lower part of their double hook $s$, engaging the said blade; during this time the spring catches R actuated by the shaft C are also lifted as shown by the arrow $x^0$ of Fig. 9, so that as the motion continues the pins $r$ are pressed against the lower surface of the lifting wires S and catch behind the spurs $s'$ as shown in Fig. 10. During this first motion of the blades the card cylinder O is pulled downward and in consequence of one of the pins $o^3$ engaging the hook $p'$ of the lever P it is compelled to make a quarter rotation so that the next card constitutes the upper surface of the prism O. When now the lifting blade commences its motion in the opposite direction the lifting wires that have been pulled out in the direction of the arrow, Figs. 9 and 10 are caught and remain in engagement with the pins $r$ of the spring catches R and are thus kept out. The card prism O is now lifted and the bar Q is turned so as to depress the spring catches R and thus facilitate the disengagement of the wires that are to retract. By reason of the springy nature of the catches however and also of the weight of the harness only those wires which are positively lifted by the pattern mechanism will be disengaged, for the others will be kept out by reason of the yielding of the spring catches R under the action of the weight of the harness so that they will remain in engagement with the wires which are to remain out in spite of the downward tendency of the springs imparted by the movement of the bar Q. Said harness frames remain thus in their upward position during the entire backward motion of the blade M and thus the shuttles have the time to finish their course. When now the blades have reached the limit of their lifting (Figs. 4 and 12) the card cylinder O has also come to its highest point and has consequently lifted the pins $q$ wherewith the loom card is provided; by this the corresponding lifting wires are lifted also, their hooks are put out of reach of the pins $r$ and the lifting wires S corresponding to the previously lifted harness frames are hung to the blade L by the upper part of their double hooks as can be seen in Fig. 13. The upward movement of the lifting wires releases their spurs from the pins $r$ and the spring catches R then assume their normal position—that is they spring downwardly and away from the said spurs, thus allowing the wires to move inward by the weight of the harness, the blade L controlling the backward movement. The rapidity of this motion of the previously pulled out lifting wires S into their normal position is checked by the motion of the blade L which takes place in the same direction (Figs. 14 and 15) so that the harness frames are prevented from going down too quickly. By the next forward motion of the blade M, in the direction of the arrow $x$ the lifting wires S which had been brought back in their normal position and were free from the blade L (Fig. 16) are carried along again if they are not, as is shown in Fig. 17, lifted again by the pins $q$. In the latter case the lower part of the double hook $s$ is out of reach of the blade M and consequently the latter glides and passes underneath the same Fig. 17.

The facility of transporting every part of the machine makes it possible to adapt the same to any ribbon loom. The same can also easily be adapted for every work that can possibly be made by the dobby.

The machine shown in the annexed drawings is located at the right upper end of the ribbon loom (Figs. 7 and 8); it can however also be placed at the left upper end of the same by simply reversing the shaft C and disposing all other organs in conformity with this change. It is also possible to dispose the blades L, M, the rods Q, T, and the spring catches R, in such a way that the rear harness frames of the loom are drawn up higher than the front harness frames as represented in Figs. 7 and 8. It is also possible to adjust the parts so that the harness frames $x$ are drawn up with varying or different speeds by adjusting of the arms $d$, $e$ and $d'$, $e'$, which is of a no small importance as it is desirable for the saving of the threads of the warp that the harness frames shall move quicker at the commencement of their upward motion than at the end of the same, when the tension of those threads is greater and when consequently an easier breaking of the thread can be expected.

By changing the place of the rollers U, I mean by lifting or lowering the same, their position can be regulated so that, as we see in Fig. 9, the weight of the harness frames $x$, has the tendency to turn the lifting wires S slightly in their base in the bar T and consequently to lift the double hook $s$, somewhat in the direction of the arrow $y^0$, in order that the lifting wires shall not rest as heavily upon the pins $q$ and that consequently the Jacquard cards shall have to exercise a less power upon the latter by which said cards are prevented from wearing away.

Fig. 9 shows a lifting wire S, provided with the double hook $s$ and the spur $s'$ disposed between the two blades L, M, which move in opposite directions; said lifting wire is connected with the harness frame by means of tapes B running over grooved pulleys U, U'; the harness frame $x$ is here shown in its lowest position. Underneath the wire are the needle board B and the pins or needles $q$, which correspond with the lifting wires S and the proper one of which, if the corresponding harness must not be lifted during the upward motion of the card prism O, lifts the lifting wire and brings the same out of reach of the lifting blade M; the latter is intended to move the lifting wire outward in the direction of the arrow $x$. The spring catch R, fixed to the oscillating bar Q is disposed under the lifting wire S. The said spring catch carries the stop $r$, intended to maintain the lifting wire S in its extreme outward position. The cross bar T guides the lifting wire and a little playing space is left in the opening of the bar T.

Fig. 10, shows how the lifting blade M carries the wire S outward in the direction of the arrow $x$ when it has not been lifted by the pin $q$ and it shows also how the blade is maintained in its extreme outward position by the stop $r$, of the spring catch R, to hold the harness up during the passage of the shuttles.

In Fig. 11, the blade M has already begun its return motion while the lifting wire S is still kept in its extreme outside position by the stop $r$.

Fig. 12, shows how the pin $q$ if it be lifted by the card prism O, lifts the wire S in order to free its spur $s'$ from the stop $r$, and in Fig. 13 we see the lifting wire S lifted so high that the spur $s'$ is entirely free from the stop $r$, so that it may be pulled back by the weight of the harness frame.

Figs. 14, 15 show the wire S hooked to the blade L during the return movement to normal position so that the speed of the downward motion of the harness frame is regulated by the direction of the arrow $x'$.

I claim—

Figure 1:
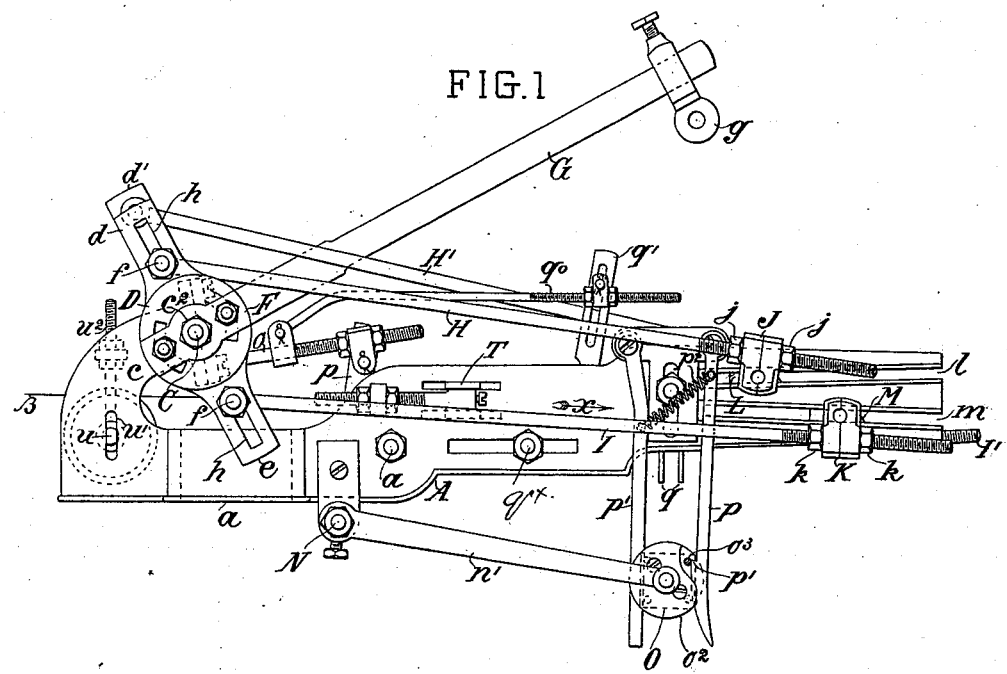
Figure 2:
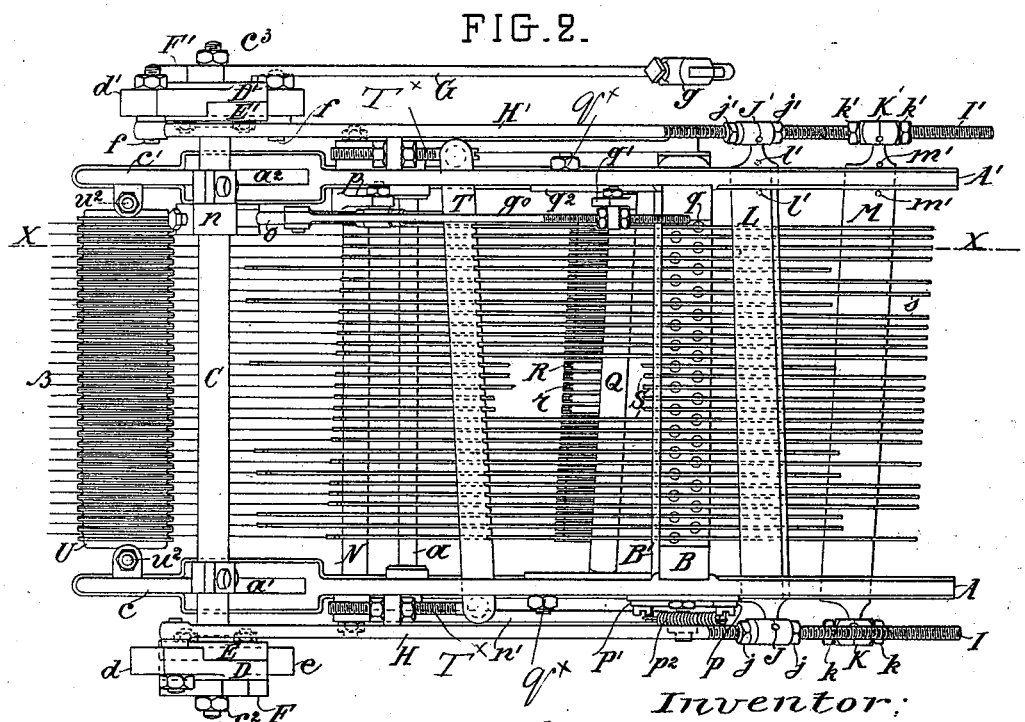
Figure 16:
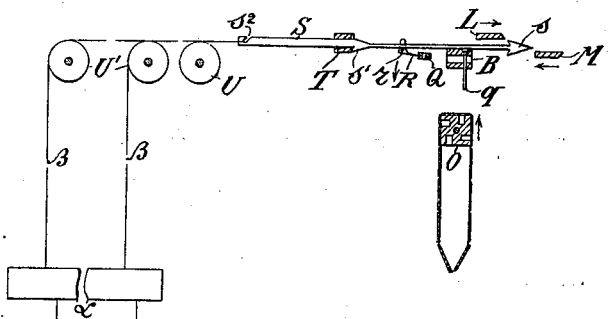
Fig. 16, shows the lifting wire in normal position, the hook $s$ now being free from the blade L.
Figure 17:
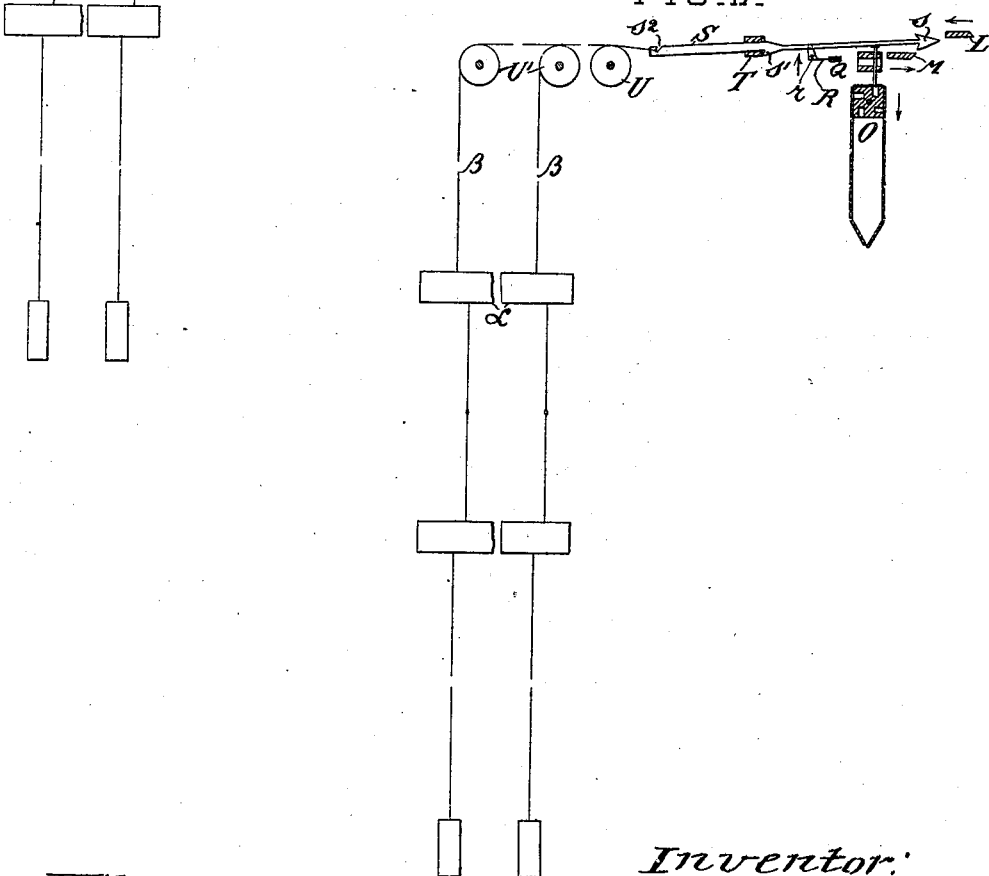
Fig. 17, shows how the blade M can pass under the hook $s$ of the lifting wire without taking the same along when said hook is lifted by the pin $q$, while in its normal position and how consequently the corresponding harness frame remains in its lowest position.

1. In combination, in a loom the lifting wires having upper and lower shoulders, the connections therefrom to the harness, the lifting blade M arranged below the wires and adapted to catch behind the lower shoulders for moving the wires outward, the card prism for lifting the wires from engagement with the lifting blade M, the blade L arranged above the lifting wires and adapted to engage the upper shoulders thereof to control the inward movement of the wires and the spring catches arranged below the lifting wires and arranged to spring up into engagement therewith, the said wires when lifted by the card prism being disengaged from said spring catches and moved to engage the upper blade L, substantially as described.

2. In combination, the lifting wires, the connections therefrom to the harness, the lifting blade M with means for operating it, the series of spring catches R for engaging the wires, the bar Q carrying the same journaled in bearings, the means for rocking said bar to raise and depress the catches, each of said catches having an independent spring action, and means for lifting the wires from engagement with the catches, substantially as described.

3. In combination, the lifting wires with connections to the harness, the lifting blade M, the blade L, the rocking bar Q carrying spring catches adapted to engage the lifting wires, the rock shaft C with means for operating the same, the radial arms on the said rock shaft, the connecting rods from said arms to the said blades L and M, the vertically movable card prism, the connections therefrom to an arm on the rock shaft and the connections from the movable rocking bar Q to said rock shaft substantially as described.

4. In combination, the lifting wires with connections to the harness, the blades L, M, adapted to engage said wires the lifting card prism with means for operating the same, the rock shaft C, the upper rods H, H' connected to the blade L, the lower rods I, I' connected to the blade M, and the adjustable disks D, D' for the rods, H, H' and the adjustable disks E, E' for the rods I, I' said disks being arranged side by side on the shaft C and held together adjustably by pins passing through arc shaped slots in the disks, substantially as described.

5. In combination, the lifting wires, the lifting blade M, the blade L, the card prism, the spring catches, the pivoted bar Q carrying the same, the means for operating all of said parts comprising the rock shaft having arms with rods connected to the blades, the levers $n'$ and $p'$ and rod $o$ connected to the said rock shaft for operating the card prism, the lever $q'$ and rod $q^0$ connected to the rod $o$ for operating the bar Q, and the means for rotating the card prism consisting of the depending hook $p$, substantially as described.

In witness whereof I have hereunto signed my name in the presence of two subscribing witnesses.

JOHANN HEINRICH TSCHOPP.

Witnesses:
GEORGE GIFFORD,
AMAND RETTER.